(12) United States Patent
Guddeti et al.

(10) Patent No.: US 9,720,488 B2
(45) Date of Patent: Aug. 1, 2017

(54) APPARATUS, METHOD, AND SYSTEM FOR EARLY DEEP SLEEP STATE EXIT OF A PROCESSING ELEMENT

(71) Applicant: Intel Corporation, Santa Clara, CA (US)

(72) Inventors: Jayakrishna G. Guddeti, Bangalore (IN); Binata Bhattacharyya, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/277,944

(22) Filed: Sep. 27, 2016

(65) Prior Publication Data

US 2017/0017296 A1 Jan. 19, 2017

Related U.S. Application Data

(63) Continuation of application No. 14/659,253, filed on Mar. 16, 2015, now Pat. No. 9,454,218, which is a continuation of application No. 12/974,086, filed on Dec. 21, 2010, now Pat. No. 8,990,602.

(51) Int. Cl.
*G06F 13/24* (2006.01)
*G06F 1/32* (2006.01)
*G06F 9/44* (2006.01)

(52) U.S. Cl.
CPC .......... *G06F 1/3287* (2013.01); *G06F 1/329* (2013.01); *G06F 1/3228* (2013.01);
(Continued)

(58) Field of Classification Search
CPC ...... G06F 13/24; G06F 1/3228; G06F 1/3287; G06F 1/329; G06F 9/4418; Y02B 60/144; Y02B 60/32
See application file for complete search history.

(56) References Cited

U.S. PATENT DOCUMENTS 8,762,994 B2 * 6/2014 Saripalli ............... G06F 9/4812 710/260
9,141,573 B2 * 9/2015 Saripalli ............... G06F 9/4812
(Continued)

FOREIGN PATENT DOCUMENTS

TW 200912738 A 3/2009

OTHER PUBLICATIONS

PCT/US2011/063853 Notification of Transmittal of the International Search Report and Written Opinion of the International Searching Authority, mailed Jun. 27, 2012, 10 pages.
(Continued)

*Primary Examiner* — M Elamin
(74) *Attorney, Agent, or Firm* — Nicholson De Vos, Webster & Elliott LLP

(57) ABSTRACT

An apparatus and method is described herein for providing an early wake scheme before spawning a new thread. An early wake indication may be provided an amount of time, which may include an amount of time to perform a demotion from a current power state to a lower power state that is closer to an active power state, before a new thread is to be spawned and executed on a processing element (e.g., core or thread). Upon encountering the spawn of the new thread, such as a helper thread, the processing element may further transition from the lower power state to an active power state. The new thread may be executed on the processing element without incurring the latency associated with execution of the new thread waiting for the demotion from the current power state to an active power state after the spawn of the new thread.

21 Claims, 4 Drawing Sheets

(52) U.S. Cl.
CPC ............ *G06F 9/4418* (2013.01); *G06F 13/24* (2013.01); *Y02B 60/144* (2013.01); *Y02B 60/32* (2013.01)

(56) References Cited

U.S. PATENT DOCUMENTS

| | | |
|---|---|---|
| 2006/0069936 A1 | 3/2006 | Lint et al. |
| 2006/0130062 A1 | 6/2006 | Burdick et al. |
| 2007/0157206 A1 | 7/2007 | Rakvic et al. |
| 2009/0307696 A1 | 12/2009 | Vals et al. |
| 2010/0064154 A1 | 3/2010 | King |
| 2010/0146513 A1 | 6/2010 | Song |
| 2012/0054750 A1* | 3/2012 | Saripalli ............... G06F 9/4812 718/100 |
| 2014/0250250 A1* | 9/2014 | Saripalli ............... G06F 9/4812 710/266 |

OTHER PUBLICATIONS

PCT/US2011/063853 Notification Concerning Transmittal of International Preliminary Report on Patentability, mailed Jul. 4, 2013, 8 pages.

Office action and Search Report with English translation from Taiwan Patent application No. 100147457, mailed Aug. 28, 2015, 12 pages.

Office action with English translation from Taiwan Patent Application No. 100147457, mailed May 20, 2016, 5 pages.

* cited by examiner

APPARATUS, METHOD, AND SYSTEM FOR EARLY DEEP SLEEP STATE EXIT OF A PROCESSING ELEMENT

CROSS-REFERENCE TO RELATED APPLICATIONS

The present patent application is a continuation application claiming priority from U.S. patent application Ser. No. 14/659,253, filed Mar. 16, 2015, now U.S. Pat. No. 9,454,218, and titled: "Apparatus, Method, and System for Early Deep Sleep State Exit of a Processing Element", which is a continuation application of U.S. patent application Ser. No. 12/974,086, filed Dec. 21, 2010, now U.S. Pat. No. 8,990,602, and titled "Apparatus, Method, and System for Early Deep Sleep State Exit of a Processing Element", both of which are incorporated herein by reference in their entirety.

FIELD

This invention relates to the field of integrated circuits and, in particular, to improving exit latency for processing elements of a processor.

BACKGROUND

Advances in semi-conductor processing and logic design have permitted an increase in the amount of logic that may be present on integrated circuit devices. As a result, the power demands of integrated circuits, such as microprocessors, have drastically increased. As a remedy, many processors now support multiple power/operating states. As the sleep states are promoted (in a direction of deeper sleep), power savings are increased due to the number of components that are progressively turned off. Yet, the deeper the sleep state, the more time it takes to wake a processing element (more functions/components have to be turned back on). As another advantage of increase in the amount of logic on integrated circuits, computer system configurations have evolved from a single or multiple integrated circuits in a system to multiple cores, multiple hardware threads, and multiple logical processors present on individual integrated circuits. A processor or integrated circuit typically comprises a single physical processor die, where the processor die may include any number of cores, hardware threads, or logical processors. The ever increasing number of processing elements—cores, hardware threads, and logical processors—on integrated circuits enables more tasks to be accomplished in parallel. This evolution from single threaded processors to more parallel, multi-threaded execution has aided execution of multiple applications at once, as well as threaded execution of single programs (serial programs that are parallelized).

Yet, one of the significant contributions to the overhead of spawning a new thread of execution includes the wake-up time of a processing element (hardware thread or core). And as deeper sleep states are encountered, as described above, the overhead of thread switches/spawns (wake-up contribution) also increases. Therefore, currently processing elements are either not put into deeper sleep states to reduce thread spawn times or thread switches are performed incurring the increased wake times. Unfortunately, the current tradeoff results in reduced power savings or in reduced performance.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth, such as examples of specific types of specific processor configurations, specific power states, specific hardware structures, specific table formats, specific register configurations, specific power units, specific types of commands/interrupts/instructions, etc. in order to provide a thorough understanding of the present invention. It will be apparent, however, to one skilled in the art that these specific details need not be employed to practice the present invention. In other instances, well known components or methods, such as specific and alternative processor architecture, specific logic circuits/code for described algorithms, specific power unit implementation details, specific power state transition details, specific and other specific operational details of processors haven't been described in detail in order to avoid unnecessarily obscuring the present invention.

The method and apparatus described herein are for performing an early wake of a processing element for reduction of wake latency associated with spawning a new thread on a non-operating processing element. Specifically, the early wake scheme is discussed with regard to waking processing elements in a microprocessor, such as processor 100. Yet, the apparatus' and methods described herein are not so limited, as they may be implemented in conjunction with alternative processor architectures, as well as any device including multiple processing elements. For example, the early wake scheme may be implemented in a cell or distributed processing device, where cells are powered down and powered back up before execution of software. Or the early wake scheme may be utilized in embedded, small form-factor devices, such as PDAs and cell phones.

Figure 1:
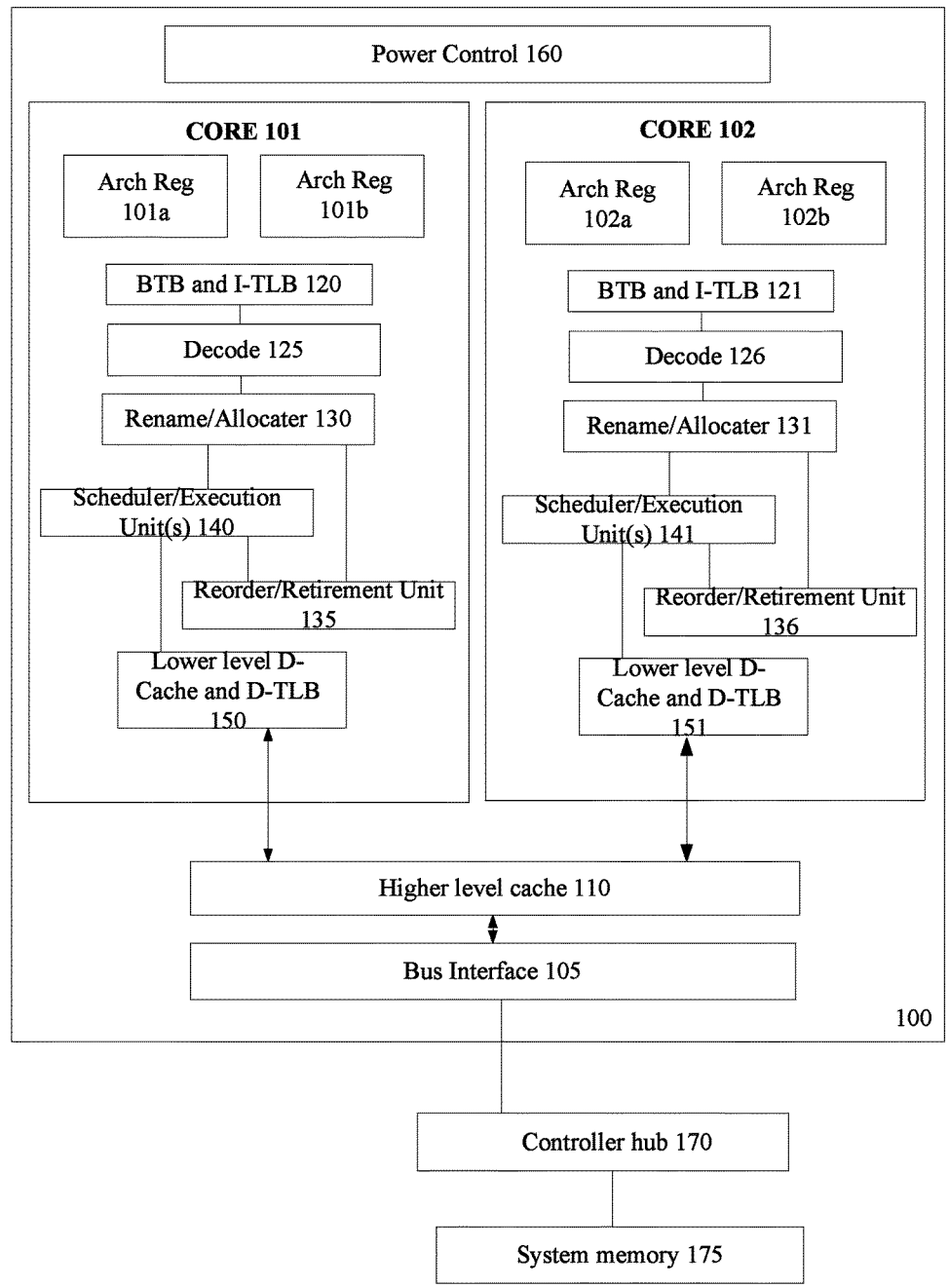
FIG. 1 illustrates an embodiment of a logical representation of a multiprocessing element processor adapted to support early wake of processing elements.

Referring to FIG. 1, an embodiment of a processor including multiple cores is illustrated. Processor 100 includes any processor, such as a microprocessor, an embedded processor, a digital signal processor (DSP), a network processor, or other device to execute code. Processor 100, in one embodiment, includes at least two cores—core 101 and 102, which may include asymmetric cores or symmetric cores (illustrated embodiment). However, processor 100 may include any number of processing elements that may be symmetric or asymmetric.

In one embodiment, a processing element refers to a thread unit, a thread slot, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. Yet to further the discussion, the functional units illustrated in core 101 are described in further detail below, as the units in core 102 operate in a similar manner.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e. four logical processors or processing elements capable of executing four software threads concurrently. As eluded to above, a first thread is associated with architecture state registers 101a, a second thread is associated with architecture state registers 101b, a third thread may be associated with architecture state registers 102a, and a fourth thread may be associated with architecture state registers 102b. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first Instruction Set Architecture (ISA), which defines/specifies instructions executable on processor 100. Here, often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific, new instructions, such as a conditional commit instruction and/or a speculative checkpoint instruction. As a result or the recognition by decoders 125, the architecture or core 101 takes specific, predefined actions to perform tasks associated with the appropriate instruction.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

In the depicted configuration, processor 100 also includes bus interface module 105 to communicate with devices external to processor 100, such as system memory 175, a chipset, a northbridge, or other integrated circuit. Memory 175 may be dedicated to processor 100 or shared with other devices in a system. Common examples of types of memory 175 include dynamic random access memory (DRAM), static RAM (SRAM), non-volatile memory (NV memory), and other known storage devices.

In one embodiment, processor 100 includes power control 160 (either centralized as depicted or distributed through processor 100) adapted to support early wake of a processing element before execution of code, such as a software thread. Previously, when a new thread is to be spawned/executed on a processing element, the processing element is transitioned from a non-operating, power state to an active state. Yet, the time from the spawn of the thread until the time when the processing element reaches the active state is potentially wasted execution time (the new thread cannot execute until the new processing element is active and ready to execute software).

Therefore, in one scenario, before a thread is to be spawned/executed on a processing element (e.g. core 102 or thread unit 102a) which is in a non-operating power state, core 102 is prematurely transitioned to a lower power state (lower indicating a power state closer to an active power state and higher/deeper referring to a power state further away from the active power state with less power consumption). As a result, when the actual spawn of the new thread is encountered, core 102 is closer to an active power state, which potentially drastically decreases processing element wake time (time between a spawn of a thread and readiness of a processing element).

As an illustrative example, either through hardware, software, firmware, or a combination thereof, an early wake indication is provided to core 102 (e.g. to power control 160 to transition core 102) before spawn of a new thread is to be executed on core 102. In one embodiment, the early wake indication is provided an amount of time before spawn of a new thread. As an example, an optimal amount of time may include a time for the power state transition of core 102 from its current power state to the destination power state. Here, the early wake indication is provided and the power state transition completes when the spawn of a new thread occurs. Note the amount of time may be determined by hardware, software, firmware, or a combination thereof. And the determination may be made either through actual time measurement or an intelligent estimation based on time or a number of intervening instructions/operations between the early wake indication and a spawn/trigger instruction, as well as any other known method for estimating duration of a power state transition.

When the early wake indication is received, the processing element transitions from a deep sleep power state to a lower power state. And when the spawn of the new thread is subsequently encountered, the processing element transitions from the new lower power state to an active power state (a reduced transition time in comparison to demotion from the deep sleep power state) to begin execution of the new thread.

In one embodiment, software is to provide the early wake indication, which may include a software command, interrupt, or instruction. Here, a compiler or optimizer, either statically or dynamically (during runtime), inserts code in a program generate/provide the early wake indication. Alternatively, a user may include the code in a program, and a compiler may compile, optimize, and/or transform the command. Essentially, as the program is executed, the software command is (in program order) performed first, which causes core 102 to transition from a higher power state to a lower power state. Upon continuing execution, a spawn or trigger instruction is encountered, and the new thread is spawned, causing the processing element to transition from the power state to an active state. And the new thread is executed on core 102, with a significantly reduced wake time.

Note that a software command may take many forms: an interrupt, a specialized early wake instruction, a write operation, or other known form for communication between hardware and software. In the interrupt scenario, the early wake indication includes a software generated interrupt to provide an early wake indication to hardware. And either as a direct hardware response to the early wake indication or upon execution of handler routine to handle the interrupt, the power state transition is performed. Here, the interrupt may include updating an interrupt control register with an early wake value, which causes the transition.

As another example, an early wake instruction, which is recognizable by decoders as an instruction within an instruction set architecture (ISA), is utilized. Here, the instruction may include information to directly update a register or provide an early wake indication to power control 160. Or an indication of a power state transition may be loaded into a register, such as a source or hint register, while an instruction that is associated with the register indicates the power state transition is to be performed. Either way, in this scenario, the power state transition is performed in response to the ISA defined instruction.

Whether the command includes an interrupt, a write, an instruction, or other known communication technique between software and hardware, the early wake indication, in one embodiment, includes a hint (a suggested transition, such as between a deep power state and a power state that power control logic may optionally ignore if other conditions are present). Here, hardware potentially implements an optional algorithm. which by default, affects the power state transition in response to the hint. Yet, if certain conditions exist, then the power state transition is delayed or ignored.

The discussion above has primarily focused on generation of an early wake indication by software to wake a hardware processing element prematurely. However, the methods and apparatus' described herein are not so limited. Instead, hardware may profile program execution and predict a spawn or trigger of a new thread. As a result of the prediction, a processing element is similarly transitioned to a lower power state to be ready for new thread execution with reduced wake time. Also the above examples often refer to transition from a deep power state to a power state (examples of which are described in more detail below) in response to the early wake indication. Yet, any power or performance state transition to reduce wake time before execution of a thread may be performed. For example, the transition may be directly from a deep power state to an active power state. And the early wake indication could potentially be provided before a thread hop (context switch of a software thread from one hardware thread unit to another hardware thread unit), instead of a spawn of a new thread.

Additionally, it should be noted that FIG. 1 illustrates an abstracted, logical view of an exemplary processor with a representation of different modules, units, and/or logic.

However, note that a processor utilizing the methods and apparatus' described herein need not include the illustrated units. And, the processor may omit some or all of the units shown. In addition, FIG. 1 only depicts two cores; yet, a processor may include any number of cores, such as multiple cores of the same type, as well as more than two cores that each differ in type.

FIG. 1 also illustrates an embodiment of processor that is coupled in a point-to-point fashion with an interface to an external memory controller (controller hub 170). However, many current processors have begun including an on-processor memory interface module—an on-chip module—with different interconnection architectures, such as a ring configuration to interconnect multiple cores, as well as shared caches and other interfaces. Although not illustrated, processor 100, in one embodiment, includes a ring interconnect coupling core, cache, and memory controller components.

Here, caching agents are utilized to manage a slice of a physically distributed cache. As an example, each cache component is to manage a slice of a cache for a collocated core—a core the cache agent is associated with for purpose of managing the distributed slice of the cache. Much like cache agents handle traffic on a ring interconnect and interface with cache slices, core agents/components are to handle traffic and interface with cores. Additionally, the ring interconnect may couple Memory Controller Interface Logic (MCIL) and/or other controllers to interface with other modules, such memory and/or a graphics processor.

Figure 2:
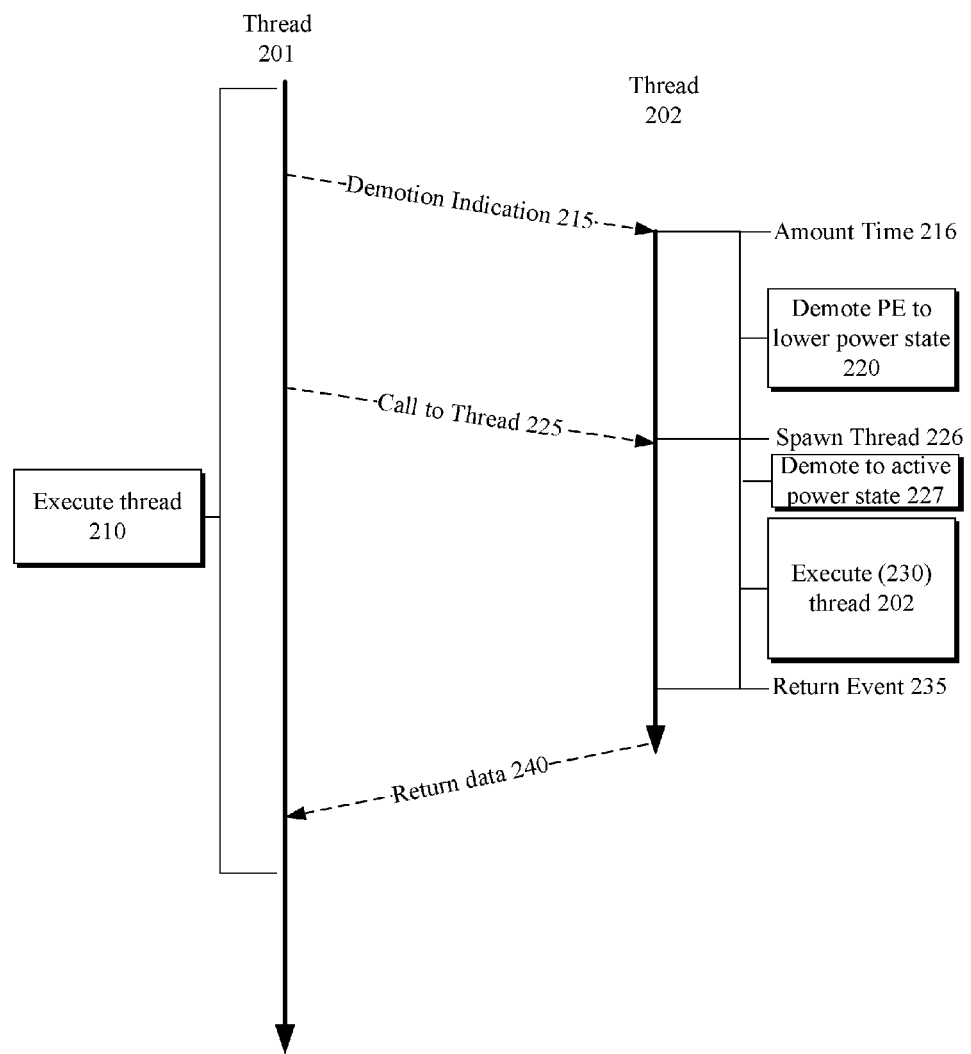
FIG. 2 illustrates an embodiment of a flow diagram for a method of waking a processing element before a spawn of a thread.

Turning to FIG. 2, an embodiment of a flow diagram for a method of waking a processing element before spawn of a thread is depicted. Here, thread 201 is being executed. As an example, thread 201 includes a main, software thread for an application or program. However, thread 201 includes any code executing a processing element, such as core 101 or a thread (threads 101a, 101b) from FIG. 1.

In one embodiment, execution of thread 201 results in generation of early wake indication 215 (sometime referred to as demotion indication, power state transition indication, or the like). As mentioned above, early wake indication 215 includes any known software indication of an event, such as an interrupt, current instruction, new instruction, operation, or combination thereof. A few illustrative examples of early wake indications are discussed immediately below.

As a first example, an early wake indication includes a software generated interrupt. Here, a typical interrupt communication process is employed. For example, generating an interrupt includes a write from software to an interrupt register, such as an interrupt control register or model specific register (MSR). In this scenario, the write includes an early wake value (a value when written to the control register to indicate an early wake event/interrupt). As a corollary, the control register includes an early wake field to accept the early wake value. In a first embodiment, the write of the early wake value to the control register is treated as a normal interrupt, where a software handler is called to service the interrupt and cause an associated power state transition.

As an alternative embodiment, the power state transition is directly performed in response to an update of the control register with the early wake value. Essentially, the interrupt service process is bypassed, and the power state transition is performed without interrupting execution with a handler. Here, when a write to the control register is performed and the early wake field holds an interrupt value, the update is treated as a normal software-generated interrupt. And when the early wake value is held in the early wake field, a power state transition is to be performed; potentially without calling a handler or interrupting execution, as discussed above. As an option, the control register may also include a destination field to be updated by a processing element identifier value. In this case, the software generated command updates the early wake field to indicate an early wake is to be performed and identifies a specific processing element to wake early. Although processing element identification is not required. Instead, a broadcast of the early wake is performed. Or hardware may determine, without direction of the software, which processing element to wake early based on its own considerations.

The first example of an early wake indication focused on a interrupt-like scenario; however, as another example the early wake indication includes an instruction. As discussed above in reference to FIG. 1, a processor typically includes decode logic that recognize and decode a set of defined instructions, which is usually referred to as an Instruction Set Architecture (ISA). In one embodiment, the write discussed above to a control register may be similarly performed by a recognized ISA instruction. As another illustrative example, a specific early wake instruction is utilized. Here, in response to detecting, recognizing, and/or decoding the early wake instruction, a power state transition is performed. A source or hint register for the instruction may hold early wake information, such as a destination power state for the transition, a processing element identifier to identify the processing element to wake, or any other known information for affecting a power state transition.

Furthermore, early wake indication 215 may include an optional demotion indication, i.e. a power state demotion indication that hardware, such as power logic 160, is able to ignore if other conditions exist; some of which the software may not be fully apprised. Therefore, in this example, hardware is given the 'final say' to ensure processing elements are not extraneously put in higher power consumption states with no need. Alternatively, the early wake indication in some embodiments is mandatory. In yet another embodiment, software, such as a user-level application/code, is able to specify whether the early wake indication is mandatory or optional; this is potentially accomplished with a field in an instruction/register that is set with a mandatory or optional value. In the scenario where the early wake indication is optional, hardware implements a decision algorithm to determine if the power state transition is to be performed in light of other system conditions. Note that any other known considerations for power consumption or performance may be utilized. And the specific disclosure thereof is not focused on to avoid derailing and obscuring the current discussion.

Extrapolating from the specific examples of early wake indications discussed above, it can be seen that any indication to cause a power state transition (either from hardware or software) before a thread is to be executed may be referred to as an early wake indication. And although the early wake indication may be generated/provided any time before a spawn/call to thread 225, in one embodiment, the early wake indication 215 is generated/provided a defined amount of time before the call to the thread to allow the power state transition to complete when the call to thread 225 is encountered/executed. As illustrated, the amount of time between early wake indication 215 and call to thread 225 is at least equal to an amount of time to demote the processing element to a lower power state 220 (the amount of time to wake/transition the processing element from a deep power state to the lower power state).

Note that achieving this duration of time between early wake indication and a call to a thread may be performed in any known manner. As some illustrative examples, an actual measurement of time is utilized between issuing the early wake indication 215 and the call to thread 225; an estimation based on the number of instructions/operations to be executed is utilized; or an interrupt or other indication is provided when the demotion is complete, which causes the call to thread 225. Also the amount of time for a processing element to demote from one power state to another may be estimated or measured. And even though the above examples primarily discuss the amount of time between indication 215 and call 225 being equal to an amount of time to demote a processing element 220, any amount of time to generate indication 215 before call 225 may be utilized.

So, responsive to indication 215, a processing element is demoted to a lower power state. Power states are often defined as product specific; however, in one embodiment, a power state refers to any state with different power specifications, such as an Advanced Configuration and Power Interface (ACPI) speciation of power states. For processors, the ACPI specification defines three basic states: C0 (an operating/active state); C1 (known as halt, where instructions are not executing but can return to an executing state); C2 (known as stop-clock, where software-visible state is maintained but it may take longer to wake up; and C3 (known as Sleep, where the processor does not keep its cache coherent but may maintain other state. In addition, variations have been made on these states. For example, an enhanced C1 state may be utilized for lower power consumption. And variations on C3/Sleep may include deeper sleep states, which require more time to wake a processing element.

Therefore, in one example, the early wake demotion includes a demotion from a C6 (deeper sleep) state to a C1 (lower power halt) state. Yet, a demotion from any higher power state, such as C2-C5, to a lower power state, such as C1-C5, may be implemented. Furthermore, as described above, the demotion also potentially includes a demotion from a non-operating power state (C1-C6) to an active power state (C0). In addition, it is important to note that the ACPI states described above are purely illustrative, as any shift from a lower power consumption state to a higher power consumption state, in one embodiment, includes a demotion of power states.

Continuing the discussion of FIG. 2, a trigger or spawn instruction initiates a call event 225 to thread 202. Note that any instruction that results in a spawn of a new thread may be referred to as a trigger instruction; whether or not the instruction explicitly calls a new thread or implicitly causes an event that results in a new thread being spawned (either by software or by hardware). In the scenario with an explicit instruction, the instruction may be part of an ISA for the processor that allows a user-thread to be spawned and executed without operating system (OS)/kernel intervention. Yet, the spawn may also include an instruction that requires OS intervention to create the thread. As a specific illustrative example, thread 201 includes a main application program. And either due to an explicit instruction or caused event (spin lock or cache miss) main thread 201 is to call/spawn helper thread 202 (a thread to perform some assistance task for main thread 201, such as run-ahead execution, prefetching of data/instructions, acquiring future locks, etc). Often a helper thread has at least a partial, if not a whole, view of the main thread's context. However, it is important to note that a call or spawn of a new thread may include a call to a completely unrelated or new thread to be executed on a different processing element.

Either way (with or without OS intervention), in response to the call or spawn of thread 202, in one embodiment, the processing element to execute thread 202, such as core 102 or thread 102a,b of core 102, is transitioned from the lower power state to an operating/active power state. Refreshing the illustrative example of ACPI states, the demotion (in response to indication 215) was from a C6 deep sleep power state to a C1 halt, lower power state. As a result, in response to encountering call to/spawn of thread event 225, core 102 is transitioned from the current, C1 power state to an active, C0 power state. And helper thread 202 is executed in flow 235 on core 102. In the scenario where thread 202 does actually include a helper thread, then some data/information (acquired locks, prefetched data/instructions, context changes, etc. may be returned to the main thread (executing on core 101) in flow 240. In the case when the early wake demotion is straight to an active power state, such as C0, then flow 227 may be omitted.

As can be seen from these illustrative examples, the wake time of a processing element to execute newly spawned thread 202 is potentially significantly decreased by waking the processing element prior to the spawn of the thread. Previously, a wake from C6 to C0 would not occur until after call to thread 225. And the time illustrated between indication 215 to call 225 for demotion of a processing element 220 would be pushed down below call to thread 225. Essentially thread 202 would have to wait for the demotion process before it could start execution. Instead, execution of thread 202, in one embodiment, only waits for a much shorter transition, such as between C1 to C0, instead of the lengthy power-up process associated with a transition from C6 to C0.

Figure 3:
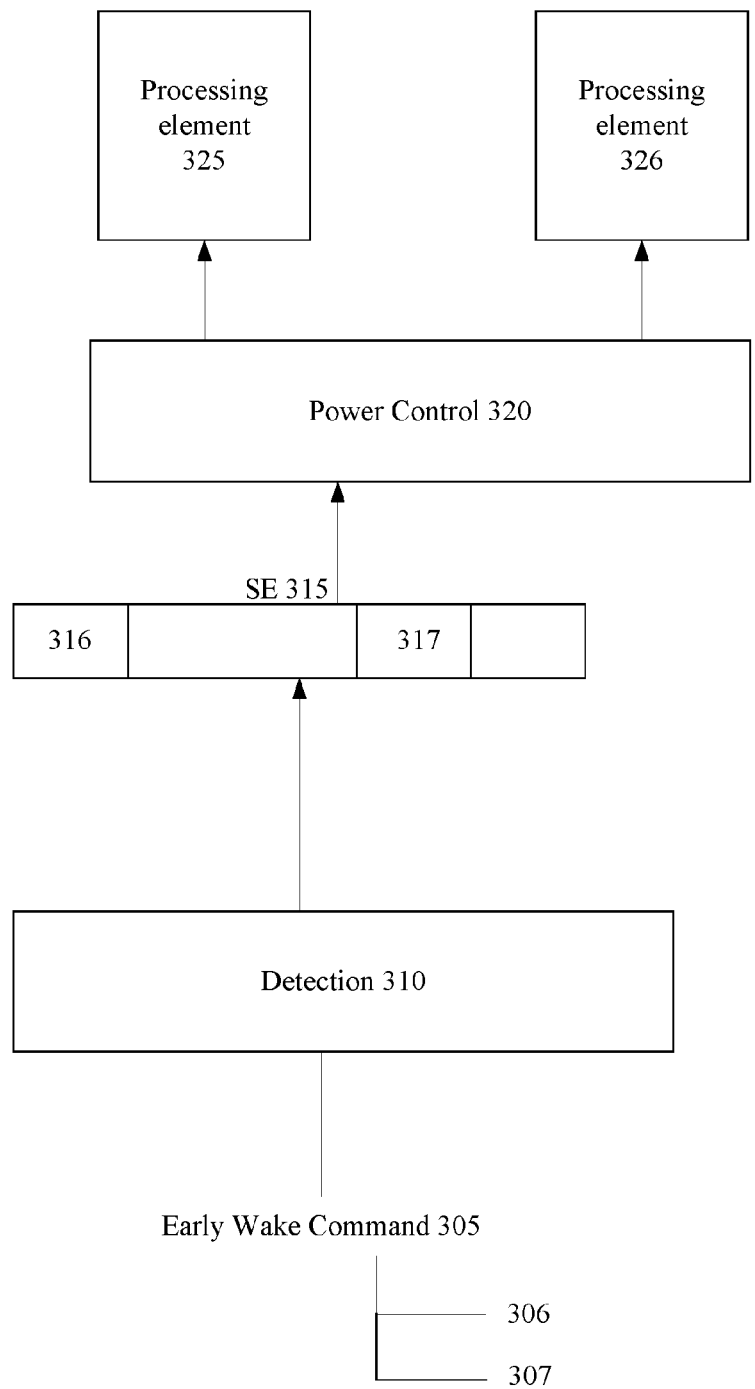
FIG. 3 illustrates an embodiment of a logical representation components adapted to support early wake of processing elements.

Turning to FIG. 3, an embodiment of a logical representation of hardware adapted to support an early wake scheme is illustrated. As illustrated, detection logic 310 is to detect an early wake command 310, such as an interrupt, write, early wake instruction, or other known software generated command. For example, detection logic 310 includes decode logic to decode instructions into operations or micro-operations, which cause an early wake of a processing element to be performed. Yet, detection logic 310 may include any logic for receiving an early wake indication, as discussed above.

Although not illustrated, storage element 315 may be coupled to detection logic 310 through other logic, pipeline stages, etc. In one embodiment, where early wake command 305 includes a software-associated interrupt, storage element 315 includes an interrupt control register (ICR). In another embodiment, where early wake command 305 includes a specific, new instruction recognizable as part of an ISA by decoders 310, storage element 315 includes a register that is associated with or identified by the instruction and holds pertinent information (early wake value 306, processing element identifier 307, etc.).

As a specific illustrative example, storage element 315 includes a hint register (either an ICR used as a hint by power control logic 320 or a hint register referenced by an early wake instruction to be provided to control logic 320), which may hold the above information. Additionally, in a scenario where the early wake power state transition is not predefined, such as a predefined transition between C6 and C1 implemented by microcode, register 315 may also hold a desired power state.

In one embodiment, storage element 315 includes an early wake field 316 to be updated by an early wake value 306 from software generated command 305. In different implementations, early wake field 316 may be utilized in different manners. For example, it may be utilized to define the type of power state transaction, such as a bit representation of what power state to transition to early (3 bits to represent a destination power state of C0 through C6). In another embodiment, where storage element 315 includes an interrupt control register, field 316 is utilized to distinguish between a normal software generated interrupt and an early wake event. Essentially, when a normal interrupt is generated by software, the command to update ICR 315 includes an interrupt value (or at least doesn't include an early wake value). As a result, based on field 316 it's determined that a normal software-generated interrupt has occurred, and a normal handler process is invoked. Alternatively, when command 305 updates storage element 315 with early wake value 306, an early wake is to be performed based on the early wake value being held in field 316. Note that as described above, some embodiments potentially include utilizing a normal interrupt process to transition power states for an early wake, instead of the hardware bypass discussed above that forgoes the invocation of a software handler.

In response to an early wake, power control 320 is to determine if a processing element is to be awoken (transitioned to a lower power state) early. In one embodiment, upon receiving early wake command 305, the transition is mandatory. Alternatively, the early wake may be optional, i.e. command 305 includes a hint. Here, power control logic 320 is adapted to implement an optional algorithm to determine if an early wake is to be performed based on receiving command 305, as well as any other known processor condition. Furthermore, in another embodiment, software is able to specify from a user-level whether command 305 is mandatory or optional, such as through another value in command 307/register 315 (not specifically shown even though field 316 may be utilized for this purpose in one scenario).

In addition to determining if an early wake is to be performed, power control is also adapted to initiate or perform the early wake for a processing element. Here, the processing element to wake may be determined by hardware, software, firmware, microcode, or a combination thereof. As a first example, software generates command 305 and hardware determines which processing element is open to receive a new thread (responsive to a future, subsequent call to a new thread) and wakes that processing element. In another embodiment, software provides an identifier (processing element identifier 307) to indicate which processing element to wake, since software is potentially more aware of subsequent threads to be spawned. Then, the determined processing element is transitioned to the appropriate power state. Here, any logic (a Power Control Unit, an Advanced Programmable Interrupt Controller, processing element specific power logic) or code, such as microcode (a layer of hardware-level instructions and/or data structures involved in the implementation of higher level machine code), implements that actual power state transition.

To provide an illustrative example, assume a main, user-level thread is executing on processing element 325 and processing element 326 is currently in a C6 deep sleep power state. Such execution of the main thread on processing element 325 results in the generation of early wake command 305, referencing early wake value 306 (a logical one to represent an early wake event instead of a normal software interrupt) and processing element identifier 307 (a logical one to reference processing element 326). Detection logic 310 receives command 305 and provides to/updates interrupt control register with early wake value 306 in field 316 and destination identifier 307 in field 317. Utilizing the update as a hint, power control 320, such as a power control unit, determines that the early wake of processing element 326 is to be performed. As a result, power control 320, such as execution of microcode associated with the power control unit, demotes processing element 326 from the current C6 power state to a C1 halt power state.

In this example, assuming a compiler organized/compiled main thread to provide early wake command 305 a defined amount of time before spawning a helper thread; then about the time processing element 326 reaches the C1 halt power state, a spawn/trigger instruction for a helper thread is encountered/performed. As a result of the spawn/trigger instruction, processing element 326 is transitioned from the now current, C1 power state to a C0 operating power state. And the new helper thread is executed without having to wait for processing element 326 to transition from the C6 power state through the C1 power state on its way to a C0 operating power state after the spawn instruction. Instead, the only latency after the call to the helper thread is the much more efficient transition between C1 to C0. Also note that in some embodiments, the transition from C6 may be all the way to C0 in response to the early wake command before encountering the spawn of the new thread.

Figure 4:
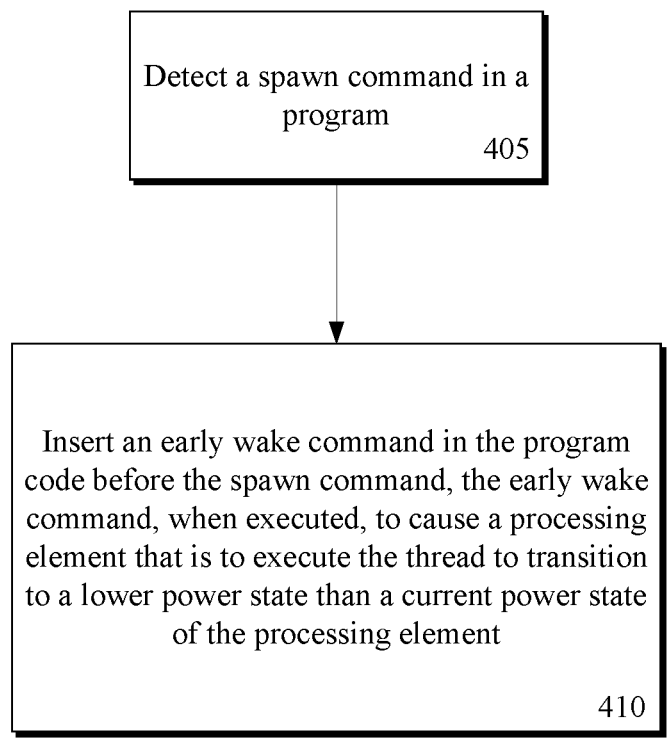
FIG. 4 illustrates an embodiment of a flow diagram for a method of detecting thread spawn points and inserting early wake commands.

Referring next to FIG. 4 an embodiment of a flow diagram for executing code, such as a compiler, to insert early wake commands is illustrated. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization. As described herein, a compiler, in one embodiment, is to compile and/or optimize code to insert early wake commands before thread spawn/triggers instructions/points.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle end, which illustrates the blurring of delineation between a front-end and back end of a compiler. As a result, reference to insertion, association, generation, or other operation of a compiler may take place in any of the aforementioned phases or passes, as well as any other known phases or passes of a compiler.

As an illustrative example, a compiler potentially inserts operations, calls, functions, etc., when executed, to provide early wake indications, in one or more phases of compilation, such as insertion of calls/operations in a front-end phase of compilation and then transformation of the calls/operations into lower-level code during a transformation phase. These insertions, in one embodiment, occur during static, whole program compilation. In another embodiment, during dynamic compilation, compiler code or dynamic optimization code may insert such operations/calls, as well as optimize the code for execution during runtime. As described above, in one scenario, either hardware or software may perform dynamic profiling of program execution to determine points of a program that potentially trigger spawning of new threads, such as instructions that repeatedly result in a high-level cache miss that causes spawning of a helper thread. And as a result, during dynamic compilation, a dynamic compiler inserts early wake commands before these trigger points to wake a processing element early to reduce thread spawn execution latency delay.

Nevertheless, the compiler (whether dynamic or static), in one embodiment, compiles program code. And in flow 405, during such compilation, a spawn/trigger command, instruction, or point for a new thread is detected. Here, an explicit ISA defined instruction includes a spawn instruction. The ISA defined instruction may include an instruction that requires a call to an operating system to spawn the new thread or may include a user-level instruction to directly spawn the thread in hardware without intervention of the operating system. As another example, a spawn command being detected includes determining an instruction that repeatedly (either through simulation or actual execution) causes a spawn of a new thread, such as an instruction or point that results in a hardware scenario that triggers a new thread. As yet another example, the compiler itself may parallelize a single-thread application, inserting a spawn instruction. Essentially, any known method for identifying a command, operation, instruction, or point that a new thread may be spawned/triggered may be utilized.

In flow 410, an early wake command is inserted in the program before the spawn command/point. As discussed above, the early wake command includes any code, such as interrupt code/command, a normal write operation, a new instruction, etc. And the early wake command, when executed, is to perform an early wake, as described above. For example, the early wake command is to cause a processing element, such as a core or thread, that is to execute the new thread to transition to a lower power state, such as a halt state, than a current power state of the processing element, such as a deep sleep state. In one embodiment, the early wake command is inserted at a point in the program code before the spawn command that equates (either by estimation or actual measurement) to the amount of time to demote the processing element from the current power state to the lower power state. Any known method of estimating or measuring time for a power state demotion may be utilized, such as an instruction count, a timer, or an estimated position within code to provide enough intervening instructions to allow a demotion of power states to occur.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding propagated signals (e.g., carrier waves, infrared signals, digital signals); etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A hardware processor comprising:
a decoder to decode an instruction into a decoded instruction; and
an execution unit to execute the decoded instruction to:
generate a wake indication for a second thread that is to be spawned from a first thread to cause a power control circuit to transition a processing element that is to execute the second thread from a first power state to a second power state within an amount of time to transition the processing element from the first power state to the second power state before the spawn, wherein the first power state and the second power state are lower power consumption states than an active power state.

2. The hardware processor of claim 1, wherein the execution unit is to execute the decoded instruction to store the wake indication in a control register.

3. The hardware processor of claim 1, wherein the wake indication includes a processing element identifier to identify the processing element from a plurality of processing elements.

4. The hardware processor of claim 1, wherein the first thread is a main thread and the second thread is a helper thread to return data from the second thread to the first thread.

5. The hardware processor of claim 1, wherein the first thread is to be executed on a first core and the processing element is a second core.

6. The hardware processor of claim 5, wherein the first core includes the decoder and the execution unit.

7. The hardware processor of claim 1, wherein the first power state is a first Advanced Configuration and Power Interface (ACPI) non-operating power state, the second power state is a second ACPI non-operating power state, and the active power state is an ACPI operating state.

8. A method comprising:
decoding an instruction into a decoded instruction with a decoder of a hardware processor; and
executing the decoded instruction with an execution unit of the hardware processor to:
generate a wake indication for a second thread that is to be spawned from a first thread to cause a power control circuit to transition a processing element that is to execute the second thread from a first power state to a second power state within an amount of time to transition the processing element from the first power state to the second power state before the spawn, wherein the first power state and the second power state are lower power consumption states than an active power state.

9. The method of claim 8, wherein the executing comprises storing the wake indication in a control register.

10. The method of claim 8, wherein the wake indication includes a processing element identifier to identify the processing element from a plurality of processing elements.

11. The method of claim 8, wherein the first thread is a main thread and the second thread is a helper thread to return data from the second thread to the first thread.

12. The method of claim 8, wherein the first thread executes on a first core of the hardware processor and the processing element is a second core of the hardware processor.

13. The method of claim 12, wherein the first core includes the decoder and the execution unit.

14. The method of claim 8, wherein the first power state is a first Advanced Configuration and Power Interface (ACPI) non-operating power state, the second power state is a second ACPI non-operating power state, and the active power state is an ACPI operating state.

15. A non-transitory machine readable medium including code, that when executed by a machine, causes the machine to perform a method comprising:
decoding an instruction into a decoded instruction with a decoder of a hardware processor; and
executing the decoded instruction with an execution unit of the hardware processor to:
generate a wake indication for a second thread that is to be spawned from a first thread to cause a power control circuit to transition a processing element that is to execute the second thread from a first power state to a second power state within an amount of time to transition the processing element from the first power state to the second power state before the spawn, wherein the first power state and the second power state are lower power consumption states than an active power state.

16. The non-transitory machine readable medium of claim 15, wherein the executing comprises storing the wake indication in a control register.

17. The non-transitory machine readable medium of claim 15, wherein the wake indication includes a processing element identifier to identify the processing element from a plurality of processing elements.

18. The non-transitory machine readable medium of claim 15, wherein the first thread is a main thread and the second thread is a helper thread to return data from the second thread to the first thread.

19. The non-transitory machine readable medium of claim 15, wherein the first thread executes on a first core of the hardware processor and the processing element is a second core of the hardware processor.

20. The non-transitory machine readable medium of claim 19, wherein the first core includes the decoder and the execution unit.

21. The non-transitory machine readable medium of claim 15, wherein the first power state is a first Advanced Configuration and Power Interface (ACPI) non-operating power state, the second power state is a second ACPI non-operating power state, and the active power state is an ACPI operating state.

* * * * *